United States Patent [19]

Podhorsky et al.

[11] Patent Number: 5,440,807
[45] Date of Patent: Aug. 15, 1995

[54] METHOD FOR MANUFACTURING HEAT EXCHANGER ELEMENTS

[75] Inventors: Miroslav Podhorsky; Harald Sassmann, both of Ratingen, Germany

[73] Assignee: Balcke-Durr Aktiengesellschaft, Ratingen, Germany

[21] Appl. No.: 238,665

[22] Filed: Apr. 22, 1994

[30] Foreign Application Priority Data

Apr. 23, 1993 [EP] European Pat. Off. ............ 93106614

[51] Int. Cl.$^6$ ............................................. B23D 15/26
[52] U.S. Cl. ........................... 29/890.039; 29/890.046; 29/890.054; 29/727
[58] Field of Search ...................... 29/890.015, 890.16, 29/890.54, 726, 727, 33 D, 33 G

[56] References Cited

U.S. PATENT DOCUMENTS

| | | | |
|---|---|---|---|
| 3,198,248 | 8/1965 | Stack | 29/840.039 |
| 3,334,399 | 8/1967 | Teeguarden | 29/890.039 |
| 3,359,616 | 12/1967 | Butt | 29/890.039 |
| 3,377,684 | 4/1968 | Gersbacher | 29/890.039 |
| 3,422,777 | 1/1969 | Plegat | 29/840.039 |
| 4,053,969 | 10/1977 | Bayard | 29/890.039 |

FOREIGN PATENT DOCUMENTS

| | | |
|---|---|---|
| 0546334 | 6/1993 | European Pat. Off. . |
| 1259266 | 6/1960 | France . |
| 1602286 | 4/1970 | Germany . |
| 4039292 | 6/1992 | Germany . |
| 4039293 | 7/1992 | Germany . |
| 1080874 | 8/1967 | United Kingdom . |

Primary Examiner—Irene Cuda
Attorney, Agent, or Firm—Robert W. Becker & Associates

[57] ABSTRACT

The method for manufacturing heat exchanger elements includes the steps of forming an open tubular base body having a longitudinal extension having a width that is substantially greater than the height thereby defining narrow and wide sides of the tubular base body. In the longitudinal extension of the tubular base body a longitudinal opening with longitudinal edges remains. Two strips of sheet metal are removed from a supply roll and corrugated to form corrugated sheet metal strips. The open tubular base body and the corrugated sheet metal strips are advance continuously and parallel to one another in the direction of the longitudinal extension through a fastening device such that the wide sides face the corrugated sheet metal strips. The corrugated sheet metal strips are pressed onto the wide sides and then fastened to the wide sides at some locations of contact between the wide sides and the of corrugated sheet metal strips. Subsequently, the longitudinal edges of the opening are joined to close the opening and form a closed tubular structure. During fastening of the corrugated sheet metal strips onto the wide sides, the wide sides of the open tubular base body are supported from the interior by a support structure.

4 Claims, 2 Drawing Sheets

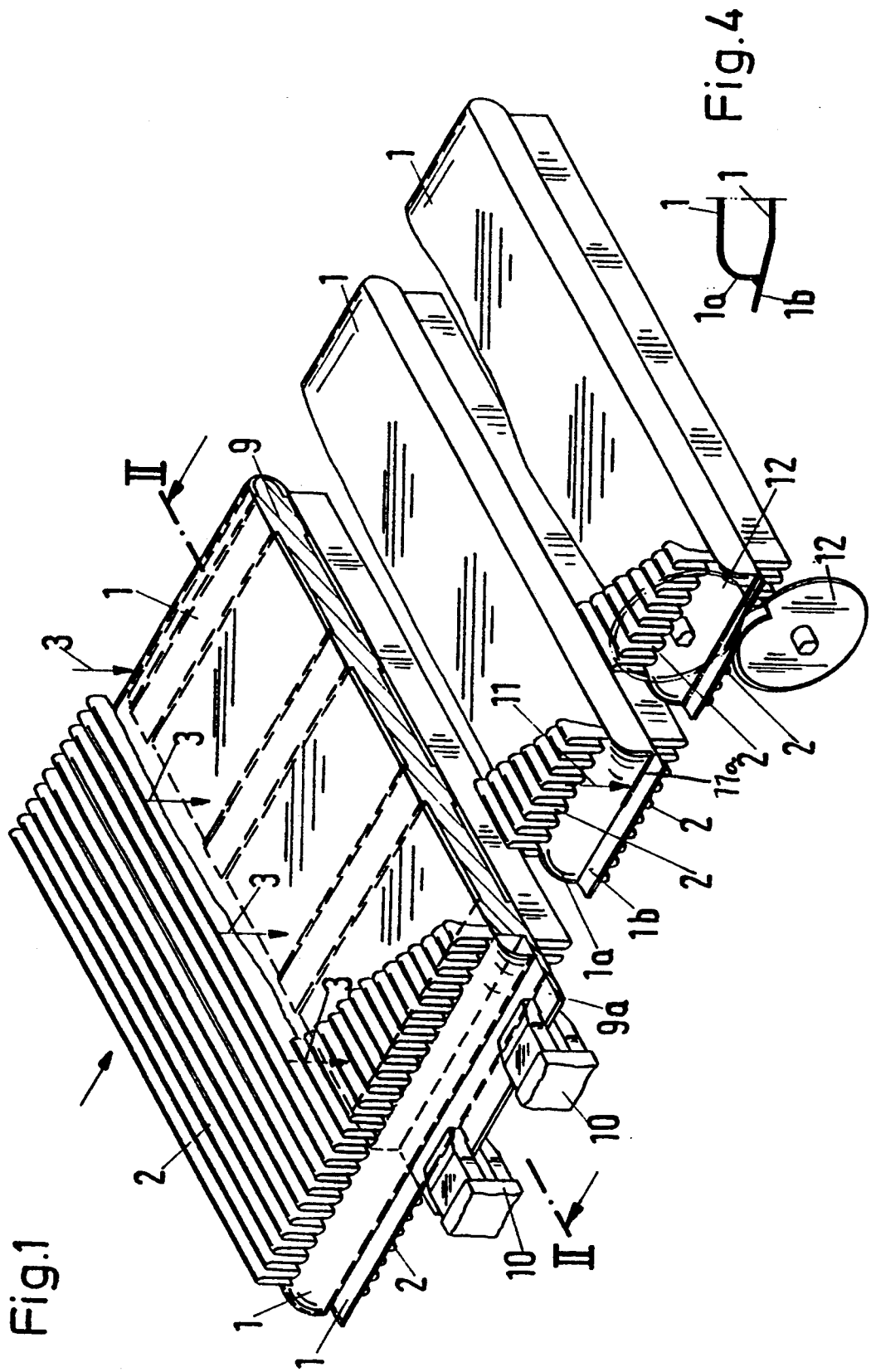

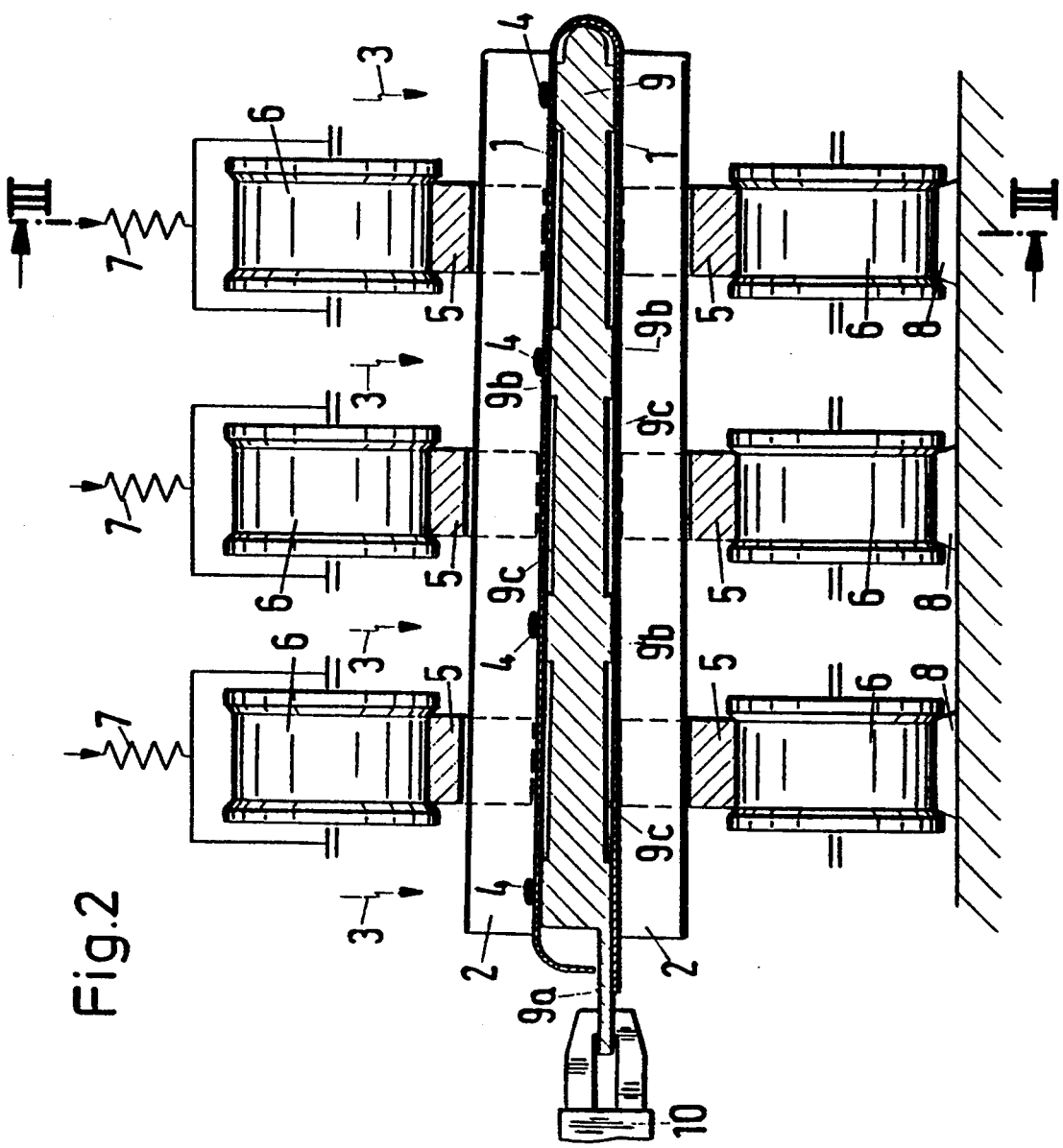

METHOD FOR MANUFACTURING HEAT EXCHANGER ELEMENTS

BACKGROUND OF THE INVENTION

The present invention relates to a method and a device for manufacturing heat exchanger elements with a tubular base body, having in cross-section a width that is substantially greater than its height and being provided at its surface with ribs that increase the heat exchanging surface area, and also relates toga tubular member produced by the inventive method and device.

Such tubular members as well as methods and a device for their manufacture are known from European Patent Application 0 546 334. According to the disclosure, on oppositely arranged wide sides of the base body profile a corrugated sheet metal strip is applied respectively in the longitudinal direction of the base body, whereby the corrugated sheet metal strips are removed from a roll and folded, respectively, corrugated before being applied to the base body. After being pressed onto the surface of the base body the corrugated sheet metal strips are connected to the base body at least at some contact locations whereby the base body together with the corrugated sheet metal strips is continuously moved in the longitudinal direction of the base body relative to a fastening device.

In the known method the specifications with respect to dimensioning of the closed tubular body are to remain within very narrow limits because it must be ensured that during attachment of the folded or wave-shaped corrugated sheet metal strips a gap-free contact is provided for the fastening process. The stiffness of the folded or wave-shaped corrugated sheet metal strips is so high that a deformation of the corrugated strips for adaptation to the base body, which is manufactured with greater tolerances, is impossible. For this reason, in the known method only precisely manufactured and thus very expensive base bodies can be used.

It is therefore an object of the present invention to improve the known method, the corresponding device and the resulting tubular member such that inexpensively manufactured base bodies with a great width and a small height can be used for attaching thereto the corrugated sheet metal strips.

BRIEF DESCRIPTION OF THE DRAWINGS

This object, and other objects and advantages of the present invention, will appear more clearly from the following specification in conjunction with the accompanying drawings, in which:

FIG. 1 is a schematic perspective representation of parts of the device important to the present invention;

FIG. 2 is a cross-section along the line II—II in FIG. 1;

FIG. 3 shows a further section along the line III—III of FIG. 2; and

FIG. 4 shows a cross-section of the edge area of an alternative embodiment of the base body.

SUMMARY OF THE INVENTION

The method for manufacturing heat exchanger elements according to the present invention is primarily characterized by the following steps:

Forming an open tubular base body having a longitudinal extension with a width and a height transverse to the longitudinal extension such that the width is substantially greater than the height, thereby defining narrow and wide sides of the tubular base body, and such that in the longitudinal extension of the tubular base body a longitudinal opening with longitudinal edges remains;

Removing two strips of sheet metal from supply roles;

Corrugated the strips of sheet metal to form corrugated sheet metal strips;

Advancing continuously in the direction of longitudinal extension through a fastening device the open tubular base body and the corrugated sheet metal strips parallel to one another such that each one of the wide sides faces one of the corrugated sheet metal strips;

Pressing the corrugated sheet metal strips to the wide sides of open tubular base body in the direction of longitudinal extension of the open tubular base body;

Fastening the corrugated sheet metal strips to the wide sides of the open tubular base body at some locations of contact between the wide sides of the open tubular base body and the corrugated sheet metal strips; and Joining the longitudinal edges of the longitudinal opening to close said longitudinal opening.

Advantageously, the method further comprises the step of supporting the wide sides of the open tubular base body from the interior of the open tubular base body at the location of contact where the corrugated sheet metal strips are fastened to the open tubular base body.

Preferably, the method further comprises the step of forming a first of the longitudinal edges as a projecting edge projecting outwardly past one of the narrow sides, wherein the step of Joining a free end face of a second one of the longitudinal edges is joined with the projecting edge.

Advantageously, the method further comprises the step of cutting off a remaining projecting portion of the projecting edge after the step of joining.

The present invention also relates to a device for manufacturing heat exchanger elements from an open tubular base body having a longitudinal extension with a width and a height transverse to the longitudinal extension, wherein the width is substantially greater than the height thereby defining narrow and wide sides of the tubular base body and wherein in the longitudinal extension of the tubular base body an opening with longitudinal edges remains, and from corrugated sheet metal strips, whereby the device according to the present invention is primarily characterized by:

An assembly device for fastening the corrugated sheet metal strips to the open tubular base body, wherein the open tubular base body and the corrugated sheet metal strips are continuously advanced parallel to one another in the direction of longitudinal extension through the device such that each one of the wide sides faces one of the corrugated sheet metal strips, the assembly device comprising:

a) a means for pressing the corrugated sheet metal strips to the wide sides of the open tubular base body in the direction of longitudinal extension of the open tubular base body, b) a means for fastening the strips of corrugated sheet metal to the wide sides at some locations of contact between the wide sides and the corrugated sheet metal strips, and c) a support structure comprising a support body with a flange and a holder, the support body inserted into the open tubular body in an area of the means for fastening with the flange extending outwardly through the opening and connected to the holder; and means for Joining the longitudinal edges of the opening to close said longitudinal opening.

Advantageously, the support body has support surfaces and recesses positioned between the support surfaces, the support surfaces and the recesses extending in a direction of advancement of the open tubular base body and the strips of corrugated sheet metal.

The present invention also relates to a tubular member for heat exchanger elements wherein the tubular member according to the present invention is primarily characterized by:

A tubular base body having a longitudinal extension with a width and a height transverse to the longitudinal extension such that the width is substantially greater than the height thereby defining narrow and Wide sides of the tubular base body and such that in the longitudinal extension of the tubular base body an opening with longitudinal edges remains;

Two corrugated sheet metal strips fastened to the wide sides of the open tubular base body at at least some locations of contact between the wide sides of the tubular base body and the corrugated sheet metal strips; and A joint closing the opening after fastening the corrugated sheet metal strips.

Preferably, the joint is selected from the group consisting of a weld seam, a soldering seam, and an adhesive seam.

According to the present invention the tubular member is manufactured by a process comprising the following steps:

Forming an open tubular base body having a longitudinal extension with a width and a height transverse to the longitudinal extension such that the width is substantially greater than the height thereby defining narrow and wide sides of the tubular base body and such that in the longitudinal extension of the tubular base body an opening with longitudinal edges remains;

Removing two strips of sheet metal from supply rolls;

Corrugated the strips of sheet metal to form corrugated sheet metal strips;

Advancing continuously in the direction of longitudinal extension through a fastening device the open tubular base and the corrugated sheet metal strips parallel to the one another such that each one of the Wide sides faces one of the corrugated sheet metal strips;

Pressing the corrugated sheet metal strips to the wide sides of the open tubular base body in the direction of longitudinal extension of the open tubular base body;

Fastening the corrugated sheet metal strips to the wide sides of the open tubular base body at some locations of contact between the wide sides of the open tubular base body and the corrugated sheet metal strips; and Joining the longitudinal edges of the opening to close said longitudinal opening;

Preferably, the step of joining comprises welding, soldering, or gluing.

According to the present invention, the tubular base body before attachment of the corrugated sheet metal strips has a longitudinal opening in the longitudinal direction, i.e., the base body has a longitudinally open profile with corrugated sheet metal strips being attached to the wide sides of the open profile before the longitudinal edges at the longitudinal opening are joined to closed the opening and form a closed tubular base body.

The inventive method has the advantage that by using an open profile before attaching the stiff corrugated sheet metal strips not only an inexpensively producible endless material may be provided as the starting material (base body) for the tubular members of the heat exchanger elements, but also during the attachment of the corrugated sheet metal strips to the base body it is possible that the wide sides of the base body can adapt to the contour of the corrugated sheet metal strip to be attached. In this manner, a gap-free contact between the corrugated sheet metal strips and the base body can be ensured at the points of contact of the parts to be connected independent of the manner of attachment, i.e., a point attachment or a linear attachment. The inventive method thus not only results in an inexpensive manufacture, but also results in a better and more uniform manufacturing quality with respect to the attachment of the corrugated sheet metal strips to the base body.

According to a further feature of the inventive method, in the area of fastening the corrugated sheet metal strips to the open tubular base body the base body is supported from the interior so that the reliability of a flawless, secure attachment is increased.

According to another embodiment of the inventive method, the free end face of one of the longitudinal edge of the base body is joined to the surface of the other (projecting) edge that is projecting from the contour of the base body so that a simple and reliable connection of the open tubular base body to a tubular closed structure results. The remaining projecting portion of the longitudinal projecting edge that projects past the joint is inventively subsequently cut off.

The inventive device for performing the inventive method is characterized by a support structure that is positioned in the interior of the base body in the area of the fastening device which support body is supported by a flange connected with a holder to a frame structure of the device. The flange projects outwardly between the separate longitudinal edges of the base body. Such a support body serves as an abutment for the pressing forces exerted during the connecting or assembly step so that a long-lasting connection between the corrugated sheet metal strips and the base body is ensured. Only the use of an initially open profile allows for the insertion of such a support structure. In a preferred embodiment of the support structure the support body is provided with support surfaces and recesses positioned between the support surfaces. Both extend in the direction of movement of base body and corrugated sheet metal strips so that frictional forces resulting from the movement of the base body relative to the support structure are reduced to a minimum.

From the two German Offenlegungsschrift publications 40 39 292 and 40 39 293 methods and devices for manufacturing ribbed heat exchanger elements are known; however, in the disclosed embodiments the tubular base body is made of two half shells which are welded to one another after attachment of the corrugated sheet metal strips. This method requires that the longitudinal edges of the half shells are to be welded together with their free end faces. Due to the unavoidable manufacturing tolerances of such half shells and the unavoidable distortion of the half shells during welding thereto the corrugated sheet metal strips, such a welding process of the two half shells to form heat exchanger elements of a great length requires in practice a great technical expenditure.

The inventive tubular member for heat exchanger elements with a tubular base body, having a cross-section of a great width in relation to a small height and having wide sides to which corrugated sheet metal strips are connected at least at some contact locations to the base body to increase the heat exchanger surface area, is characterized in that the base body is formed by an initially open profile having longitudinal edges that are later connected to form a closed profile. According to further embodiment of the invention, the longitudinal edges can be joined by welding, soldering, or gluing.

DESCRIPTION OF PREFERRED EMBODIMENTS

The present invention will now be described in detail with the aid of several specific embodiments utilizing FIGS. 1 through 4.

FIGS. 1 to 3 show a base body which is formed from a sheet metal strip and which is open in the longitudinal direction on one side. This is best seen in the cross-section of FIG. 2. The cross-section of the base body 1 has a Great width relative to its height.

Onto each of the oppositely arranged wide sides of the base body 1 a corrugated sheet metal strip 2 is attached which has been removed from a supply roll and is then corrugated, i.e., folded or wave-shaped, before attachment to the base body. The two corrugated sheet metal strips 2 are attached either one after another onto the wide sides of the base body or, as shown in the embodiment represented in the drawings, simultaneously to both wide sides of the base body 1. Base body and corrugated sheet metal strip(s) are guided with a continuous advancing movement together to a fastening device which is symbolically represented in FIGS. 1 and 2 by the arrows 3. The fastening device may be, for example, in the form of a welding device using a laser beam, with which the corrugated sheet metal strips 2 are spot-welded onto the respective wide side of the open tubular base body 1. Respective spot welds 4 are shown in FIG. 2.

Since the attachment of the corrugated sheet metal strips 2 to the base body 1 require a gap-free contact between the corrugated sheet metal strips 2 and the base body 1, a pressure force is applied to the corrugated sheet metal strips 2 during the relative movement of the corrugated sheet metal strips 2 in contact with the base body profile 1 relative to the fastening device represented by arrows 3 in a symbolic manner. In the embodiment according to FIGS. 2 and 3, pressure plates 5 are shown which, according to FIG. 3, engage corrugations and are biased by pressure rollers 6 which in turn, are biased by pressure springs 7.

In the shown embodiment the fastening device represented by arrows 3 is stationary so that the pressure blades 5 are continuously moved together with the base body 1 and the corrugated sheet metal strips 2. According to FIG. 2, only the upper pressure rollers 6 are biased by pressure springs 7; the lower pressure rollers 6 are guided on stationary rails 8.

Due to the open profile of the base body profile 1, having a longitudinal opening opening in the longitudinal direction, it is possible to adapt the two wide sides of the base body profile 1 to the shape of the corrugated sheet metal strips 2 in the area of the fastening device; due to the folding, respectively, corrugation the corrugated sheet metal strips themselves have a high stiffness and therefore cannot adapt to imprecisions of the base body profile 1.

In order to facilitate this adaptation and in order to generate a counter force for the pressure forces applied to the corrugated sheet metal strips 2 by the pressure blades 5, a support structure comprising a support body 9 is arranged in the interior of the open base body 1 which with its flange 9a projects outwardly through the longitudinal opening of the base body 1 as can be seen in FIGS. 1 and 2. With this flange 9a the support body 9 is stationarily connected to a holder 10 of the frame of the device. The base body 1 which is open in the longitudinal direction thus can be moved relative to the stationary support body 9.

As is shown in FIGS. 1 and 2, the support body 9 is provided in the direction of relative movement with support surfaces 9b and with recesses 9c positioned between the support surfaces 9b. The support surfaces 9b are provided exclusively in the area of the desired connection (fastening) between the corrugated sheet metal strips 2 and the base body 1 so that while providing sufficient support the friction between the interior walls of the base body profile 1 and the surface of the support body 9 is reduced to the necessary degree by providing the recesses 9c.

As soon as the corrugated sheet metal strips 2 are connected to the wide sides of the open tubular base body 1, the longitudinal edges defining the longitudinal opening of the base body profile 1 joined (connected) to close the opening and form a closed tubular structure. This joint (seam) 11a in FIG. 1 can be made, for example, with a laser beam (a device for this operation is schematically represented by arrow 11). In the shown embodiment the end face of the longitudinal edge 1a is connected with the projecting edge 1b of the other longitudinal edge. Accordingly, unavoidable deformations of the longitudinal edges do not have a negative effect on the welding seam to be generated. In an alternative embodiment the edges are designed as shown in FIG. 4. In this alternative embodiment the projecting edge 1b is angled relative to the corresponding wide side of the base body 1 at an acute angle.

Subsequent to forming the joint (seam) at the longitudinal edges of the base body 1, resulting in a closed tubular structure, the remaining projecting portion Of the edge surface 1b is cut off. This is symbolically represented in FIG. 1 by the cutting wheels 12.

The present invention is, of course, in no way restricted to the specific disclosure of the specification and drawings, but also encompasses any modifications within the scope of the appended claims.

What we claim is:

1. A method for manufacturing heat exchanger elements, said method comprising the steps of:
    forming an open tubular base body having a longitudinal extension with a width and a height transverse to said longitudinal extension such that said width is substantially greater than said height, thereby defining narrow and wide sides of said tubular base body, and such that in said longitudinal extension of said tubular base body a longitudinal opening with longitudinal edges remains;

removing two strips of sheet metal from supply rolls;

corrugating the strips of sheet metal to form corrugated sheet metal strips;

advancing continuously said open tubular base body and said corrugated sheet metal strips parallel to one another in the direction of, said longitudinal extension of said open tubular base body through a fastening device and positioning said corrugated sheet metal strips such that each one of said wide sides faces one of said corrugated sheet metal strips;

pressing said corrugated sheet metal strips to said wide sides of said open tubular base body in the direction of longitudinal extension of said open tubular base body;

fastening said corrugated sheet metal strips to said wide sides of said open tubular base body at some locations of contact between said wide sides of said open tubular base body and said corrugated sheet metal strips; and joining said longitudinal edges of said longitudinal opening to close said longitudinal opening.

2. A method according to claim 1, further comprising the step of supporting said wide sides of said open tubular base body from the interior of said open tubular base body at the locations of contact where said corrugated sheet metal strips are fastened to said open tubular base body.

3. A method according to claim 1, further comprising the step of forming a first of said longitudinal edges as a projecting edge projecting outwardly past one 0f said narrow sides, wherein in said step of joining a free end face of a second one of said longitudinal edges is joined with said projecting edge.

4. A method according to claim 3, further comprising the step of cutting off a remaining projecting portion 0f said projecting edge after said step of joining.

* * * * *